A. FARRAR.
Apparatus for the Manufacture of Carbon Black.
No. 6,135. Reissued Nov. 17, 1874.
*Fig. 1.* *Fig. 2.*
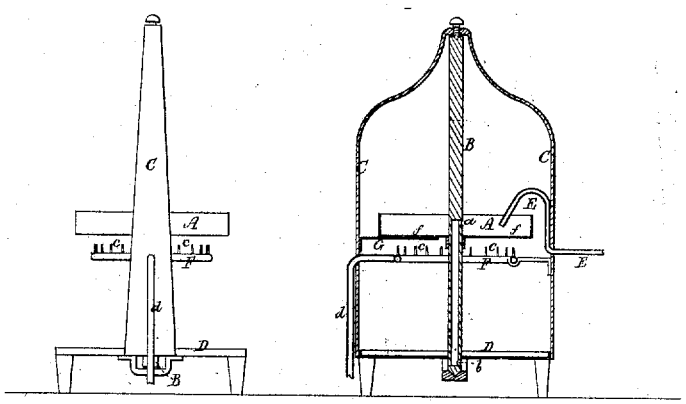
Witnesses.
S. N. Piper
L. N. Höller
Alonzo Farrar,
by his attorney.
R. H. Eddy

UNITED STATES PATENT OFFICE.

ALONZO FARRAR, OF BROOKLINE, MASSACHUSETTS.

IMPROVEMENT IN APPARATUS FOR THE MANUFACTURE OF CARBON-BLACK.

Specification forming part of Letters Patent No. 154,467, dated August 25, 1874; reissue No. 6,135, dated November 17, 1874; application filed October 7, 1874.

*To all whom it may concern:*

Be it known that I, ALONZO FARRAR, of Brookline, of the county of Norfolk and State of Massachusetts, have made a new and useful invention having reference to the manufacture or production of carbon-black from carbureted hydrogen gas, particularly such as usually escapes from oil-wells or borings in the earth for obtaining petroleum; and I do hereby declare the same to be fully described in the following specification and represented in the accompanying drawings, of which—

Figure 1 is a front elevation, and Fig. 2 a vertical and transverse section, of the apparatus or mechanism I have invented for obtaining smoke deposits or "carbon-black."

In such drawings, A denotes a cylindrical shallow pan or vessel, mounted concentrically upon a vertical shaft, B, arranged within and pivoted at its ends to a frame, C. The said shaft, from the vessel A, is tubular down, or nearly down, to its lower end, there being a hole, *a*, leading laterally out of the shaft into the vessel at a suitable height above the bottom thereof. There is also another such hole or aperture, *b*, leading out of the shaft near its lower end, and below a shallow receiver, platform, or pan, D, arranged underneath the rotary vessel A. An induct or pipe, E, disposed as shown, is employed for the purpose of supplying the vessel A with water.

Directly underneath the vessel A, and concentric with its shaft, is one or more tubular rings, F, furnished with a series of gas-burners, *c c c*, extending from it, as shown, a pipe, *d*, being employed to convey gas into the ring from an oil-well or a gas-holder.

One or more scrapers, G, supported by the frame C, and arranged against the bottom of the pan or vessel A, serve, while the pan is in revolution, to remove from it the carbon-black or smoke deposit.

The operation of the machine may be thus described: On gas being supplied to the burners and inflamed thereon, and water being allowed to flow into and out of the vessel A, and the latter with its shaft being put in revolution, the smoke of the burners will impinge directly upon the lower surface of the plate *f*, composing the bottom of the vessel A. The carbon deposited on the said bottom by the smoke, will be removed therefrom by the scraper, and will fall upon or into the receiver D. The water flowing into the vessel A will rise therein, and escape therefrom through the hollow shaft; while in the vessel the water will keep its bottom cool, or at a temperature such as will not only preserve such bottom from being injured by the flame, but prevent the smoke deposit or carbon from being discolored or browned, as it would be liable to be should the heated surface on which it may be deposited become very hot.

With the apparatus or machine as described, the operations of producing the carbon-black upon and its removal from the vessel A are automatically and continuously effected.

I claim as of my invention as follows—that is to say:

1. The combination of one or more gas-burners, and a pan or vessel arranged directly over such, with a pipe or induct for conveying water into said vessel, and with a pipe or educt for discharging such water therefrom, such induct and educt being to cause the water to so flow continuously into, through, and out of the vessel as to abstract and carry off heat from its bottom, and maintain such bottom at a low temperature, such as will prevent, during the deposits of carbon-black on said bottom, such deposits from being browned or changed in color by the heat of the flame of the gas.

2. The combination of one or more gas-burners, and a pan or vessel arranged directly over such, with a scraper applied to the bottom of such vessel, a pipe or induct for conveying water into said vessel, and a pipe or educt for discharging such water therefrom, as set forth, such scraper being to remove from the bottom of the vessel the carbon deposited and cooled therein.

3. The rotary water-vessel A and its eduction-shaft B, arranged and combined with one or more gas-burners, *c*, and a stationary scraper, G, all being to operate substantially as and for the purposes specified.

4. The combination of the stationary platform, pan, or reservoir D, the rotary reservoir A, the eduction-shaft B, the stationary scraper G, and one or a series of gas-burners, *c*, all arranged substantially in manner, and supplied with an induct, and to operate as and for the purposes described.

ALONZO FARRAR.

Witnesses:
R. H. EDDY,
J. R. SNOW.